United States Patent [19]

Kornbrekke et al.

[11] Patent Number: 4,823,010
[45] Date of Patent: Apr. 18, 1989

[54] SLIDING DOOR THRESHOLD SENSOR

[75] Inventors: Henning N. Kornbrekke, Burlington; Anthony R. Ranaudo, Naugatuck, both of Conn.

[73] Assignee: The Stanley Works, New Britain, Conn.

[21] Appl. No.: 48,634

[22] Filed: May 11, 1987

[51] Int. Cl.⁴ .............................................. E05F 15/20
[52] U.S. Cl. .................................... 250/341; 250/221; 49/25; 340/545
[58] Field of Search ................ 250/341, 221; 49/25, 49/26, 29, 30; 377/43; 328/55; 340/545, 552

[56] References Cited

U.S. PATENT DOCUMENTS

| Re. 30,719 | 8/1981 | Mills | 49/25 |
|---|---|---|---|
| 3,852,592 | 12/1974 | Scoville et al. | 250/221 |
| 3,857,466 | 12/1974 | Berkovitz et al. | 250/221 |
| 4,207,466 | 6/1980 | Drage et al. | 250/341 |
| 4,560,912 | 12/1985 | Jönsson | 49/25 |
| 4,563,625 | 1/1986 | Kornbrekke et al. | 318/602 |
| 4,565,029 | 1/1986 | Kornbrekke et al. | 49/25 |
| 4,590,410 | 5/1986 | Jönsson | 318/460 |
| 4,669,218 | 6/1987 | Kornbrekke et al. | 250/221 |
| 4,698,937 | 10/1987 | Kornbrekke et al. | 250/221 |
| 4,713,545 | 12/1987 | Norrgren et al. | 250/221 |

Primary Examiner—Janice A. Howell
Assistant Examiner—William F. Rauchholz
Attorney, Agent, or Firm—Chilton, Alix & Van Kirk

[57] ABSTRACT

A threshold safety sensor for a sliding door system employs infrared transmitters and a photo diode for detecting traffic at or near the threshold of a sliding door system. The transmitters are pulsed in a time spaced sequence. An input signal derived from the operate initiating signal of the automatic door operator is employed for enabling a latch. The latch sets a relay to a state for maintaining the doors in an open position when traffic is detected in the sensor detection zone.

21 Claims, 6 Drawing Sheets

SLIDING DOOR THRESHOLD SENSOR

BACKGROUND OF THE INVENTION

The present invention relates generally to traffic responsive control systems for automatic sliding doors. More particularly, the present invention relates to a new and improved traffic responsive control system for sensing traffic at or in the vicinity of the doorway threshold and for maintaining the sliding doors in an opened position until the traffic clears the door threshold.

A number of sliding door systems are automatically operable for initiating an opening sequence upon sensing the motion or presence of traffic at the doorway, or receiving a command from a push plate, card reader, mat or other operation initiating means. A number of automatic door systems employ infrared sensors which sense the traffic approaching the doorway by sensing changes in received passive infrared radiation. The infrared sensors sense traffic for initiating the door opening sequence. Infrared transmitters have also been used for generating safety beams for insuring that the door does not inadvertently open or close.

The use of infrared radiation for sensing traffic in connection with automatic door systems is subject to a number of design and operational constraints. For example, the moveable door which traverses through a portion of the traffic path presents a potential for interference with the detection system and must be taken into account in the system design or otherwise compensated for by the detection processing system. The transmitters and detectors must be positioned so as to cover a sufficiently wide area of the traffic path while also minimizing interference from the moving door. Accordingly, relatively complex transmitter and detector beam paths and/or specially designed photoemitter and photodedector lens configurations are incorporated into many infrared sensor systems. The safety beam infrared sensor applications frequently do not provide a large region of coverage. Many such systems also require the separate installation of several units.

Scoville et al U.S. Pat. No. 3,852,592 discloses an automatic swing-door operator which employs a traffic control having an infrared emitter and detector. The emitter is mounted at the header of the door system and generates a directed energy beam having a preselected divergence which spans the path of travel of traffic approaching the doorway. The emitter is located substantially on the hinge line of the door. The detector is mounted adjacent the opposite jamb and has an axis of sensitivity which is oriented transversely of the beam of energy.

Kornbrekke et al U.S. Pat. No. 4,565,029 discloses an automatic door installation which employs four traffic sensors mounted on the door jambs on opposite sides of the doorway opening. The sensors have infrared energy emitters and infrared energy receivers for sensing the doorway traffic. Two sensors are employed to cover the exit or swing side of the doorway. A threshold sensor is employed to cover the threshold area. An entrance sensor is employed to cover the entrance side of the doorway. The entrance and exit sensors each have a plurality of radiant energy emitters with angularly spaced beam axes which provide relatively broad coverage areas intersecting the travel path. The emitters are selectively deactivated as the door is swung to its opened and closed positions to avoid sensing the door. The emitters of each of the sensors are pulsed in a pre-determined sequence and the receivers are synchronously activated to receive reflected radiant energy from the emitters.

Jonsson U.S. Pat. No. 4,590,410 and Jonsson U.S. Pat. No. 4,560,912 each disclose an infrared object sensing apparatus for an automatic door wherein a plurality of radiation emitting elements are arranged to radiate a diverging beam of radiation into a selected region of space. A plurality of radiation sensing elements are arranged in proximity to the emitting elements for receiving radiation reflected from traffic within the region. The transmitting and receiving elements may be arranged in separate linear arrays which are separated by relatively small distances.

SUMMARY OF THE INVENTION

The present invention is a new and improved safety system for automatic sliding door systems which senses the traffic at the sliding door threshold and in the vicinity thereof and generates a signal to the automatic operator for maintaining the sliding doors in the opened position until the traffic clears the threshold area.

Briefly stated, the invention in a preferred form is a threshold safety sensor for a sliding door system of a type wherein an automatic operator is at least partially responsive to an operate signal for initiating the operation of a sliding door which is transversely moveable across a threshold. The sensor comprises a plurality of infrared transmitters which are energizable for emitting infrared radiation to define a detection zone. The detection zone substantially encompasses the region above the threshold and the threshold vicinity at opposing sides of the threshold. The operation of the sensor is synchronized with the alternating current line voltage which powers the unit. The transmitters are sequentially pulsed in a series of time spaced pre-established pulse intervals. A receiver detects infrared radiation which is reflected from the detection zone and generates a corresponding electrical detection signal. The detection signal is electronically processed for determining whether an object is present in the detection zone. A signal indicative of the status of the operate signal is supplied to the sensor. A latch circuit is responsive to the processor circuitry and enabled by the operate input signal for activating a latch to a latched state in the event that an object is present in the detection zone and the operate signal is present. A hold open output is generated in response to the latch status for preventing a sliding door from closing when an object is present in the detection zone.

In a preferred embodiment of the invention, the receiver is a photo diode and the transmitters are angularly spaced infrared transmitters. The sensor circuitry is housed in a housing which is mounted generally above the threshold of the sliding door. The transmitters are oriented at divergent angles so as to define overlapping regions of the detection zone. In one embodiment, there are four infrared transmitters with each transmitter having a central beam axis which is oriented at approximately 12° with respect to a vertical line through the axis.

The pulse intervals are substantially equal and are time spaced by substantially equal time intervals. The receiver and the processor operate to detect an object in the detection zone irrespective of the position or operational status of the door. A time delay is implemented for maintaining the latch in a latched state for a pre-established time interval after an object leaves the detection zone. The processor circuitry further comprises a counter for counting pulses derived from the electrical detection signal and a phase select circuit for selecting pulses having a pre-established phase relationship with the radiation emitted by the transmitters.

A switch is employed for selecting between two phase states to synchronize the operation of the sensor with the applied line frequency. The phase states are 180° out of phase with each other so that two sensors may be operated in close proximity at different operational phase states without interference.

An object of the invention is to provide a new and improved sliding door sensor for sensing the presence of traffic in the vicinity of the door threshold.

Another object of the invention is to provide a new and improved sliding door threshold sensor of efficient and relatively inexpensive construction may be relatively easily installed and operatively employed in association with the operator of a sliding door system.

A further object of the invention is to provide a new and improved sliding door threshold sensor which operates in a highly energy efficient manner and is not readily susceptible to noise or interference from nearby sensor systems.

A yet further object of the invention is to provide a new and improved safety threshold sensor which may be easily incorporated with automatic door operators for reliably sensing the presence of traffic at and in the vicinity of the door threshold to thereby maintain the door in an opened position until the traffic clears the threshold.

Other objects and advantages of the invention will become apparent from the drawings and the specification.

DETAILED DESCRIPTION OF THE INVENTION

With reference to the drawings wherein like numerals represent like parts throughout the Figures, a threshold sensor designated generally by the numeral 10 is illustrated in conjunction with a sliding door system designated generally by the numeral 12. The sliding door system includes a pair of doors 14 and 16 which slide along a track (not illustrated) under the control of an automatic operator mounted in the door header 18. The automatic operator (not illustrated) may be any of numerous forms which automatically control the operation of a door. A preferred automatic operator is the operator system disclosed in U.S. Pat. No. 4,563,625 assigned to the assignee of the present invention.

Threshold sensor 10 is a safety sensor which operates in conjunction with the automatic operator to sense the presence of traffic in the vicinity of and at the door threshold and to generate a signal to the automatic operator for maintaining the sliding doors in an opened position until the traffic clears the threshold area. The threshold sensor is especially adapted for sliding door systems and may be employed in conjunction with numerous automatic operators, none of which are illustrated in the present application.

Figure 1:
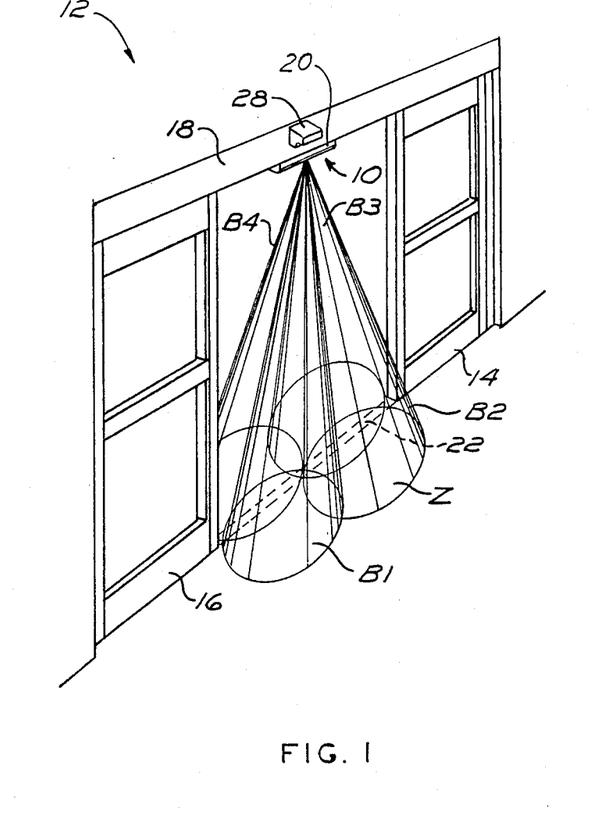
FIG. 1 is a perspective view of a sliding door system and an installed threshold sensor of the present invention with a detection zone of the sensor being diagramatically illustrated.
Figure 2:
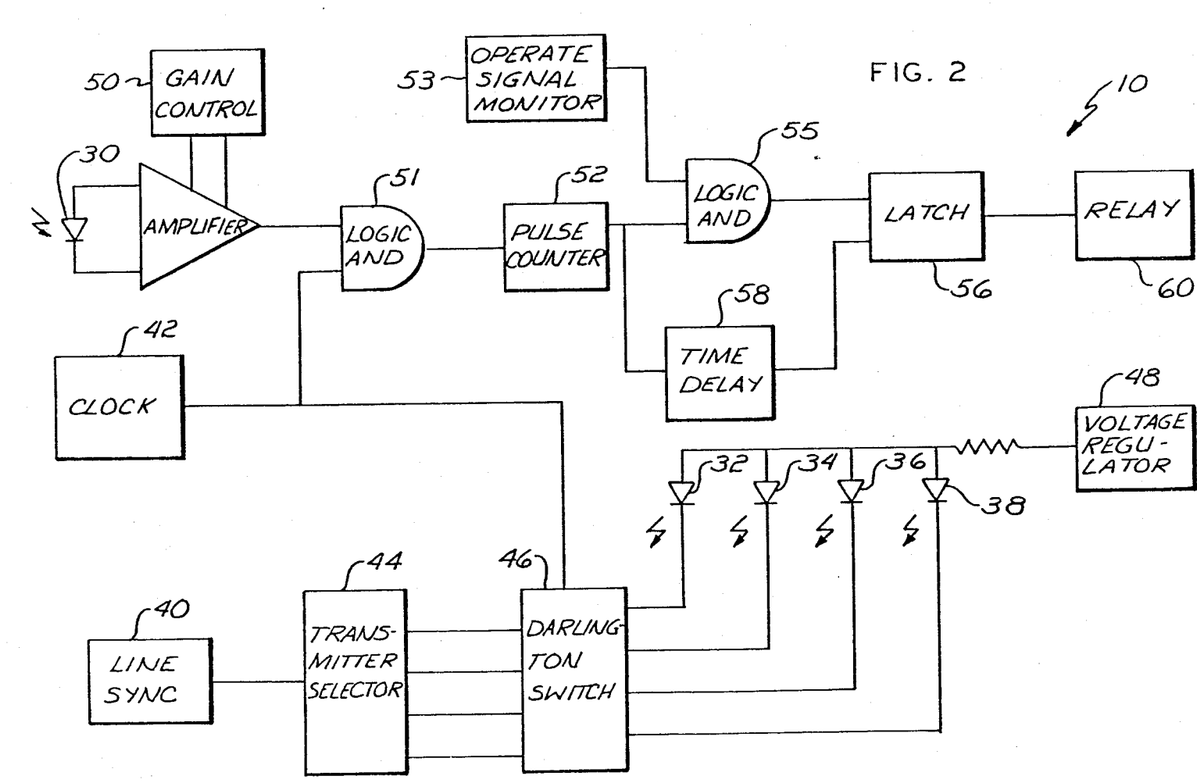
FIG. 2 is a logic block diagram of the sliding door threshold sensor of FIG. 1.
Figure 4:
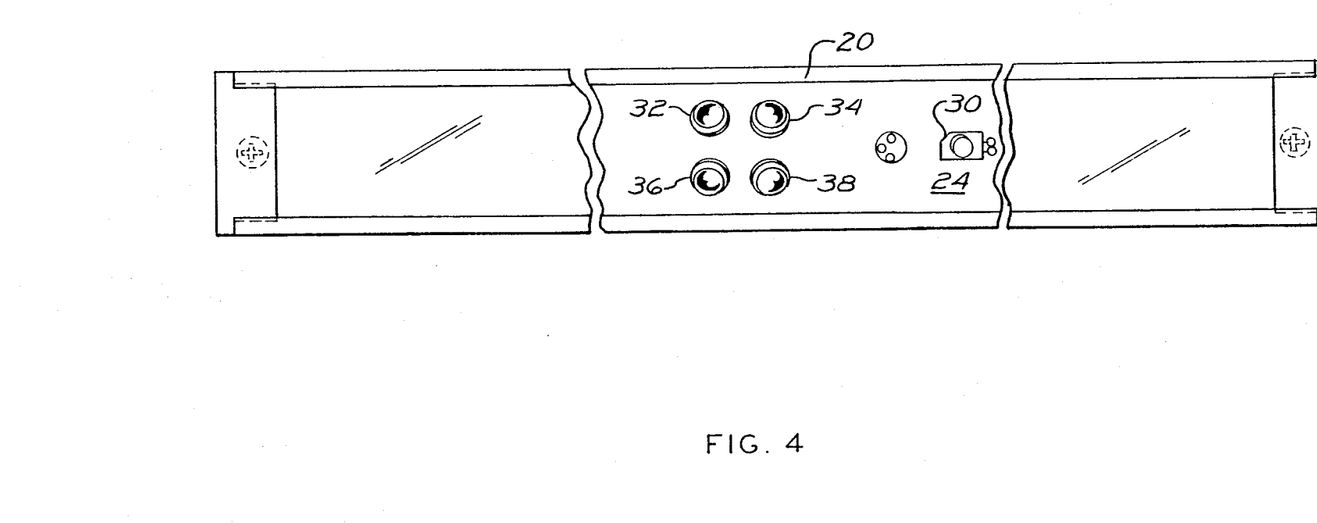
FIG. 4 is a bottom view, partly broken away, of the sensor system of FIG. 1.

With additional reference to FIGS. 2 and 4, the threshold sensor 10 includes an elongated quasi-rectangular housing 20 which mounts at the underside of the door header 18 above the threshold 22. The housing 20 is relatively compact. In one embodiment, the housing has a height, width and length of approximately 1.1, 1.5, and 17.5 inches, respectively. The housing 20 houses the electronic circuitry for the sensor and mounts an infrared detector 30 and four angularly spaced infrared transmitters 32, 34, 36 and 38. The transmitters and the infrared detector are mounted at a fixed pre-established directional orientation at the underside of a circuit board 24 mounted in the housing. The transmitters are operable to generate infrared detection beams B1, B2, B3 and B4 which traverse a window (not illustrated) at the housing underside to define a detection zone Z in the vicinity of the threshold 22 as best illustrated in FIG. 1.

Figure 5:
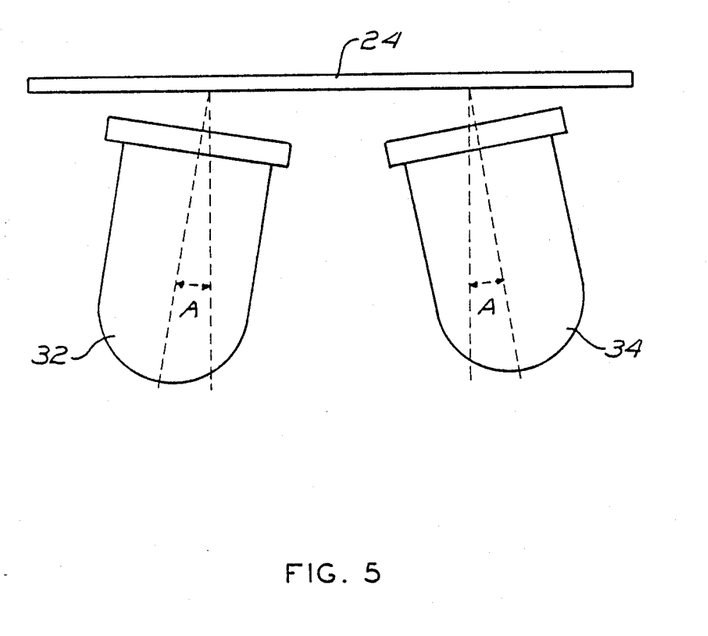
FIG. 5 is a diagram illustrating directional angles for the sensor elements and the detection zone of the sliding door threshold sensor of FIG. 1.

The transmitters are located in close relative proximity. In one embodiment, the distance between transmitters is no greater than one inch. In preferred form, each of the infrared transmitters has a half angle power of 50°. With additional reference to FIG. 5, the transmitters are mounted in mutually diverging relationship wherein each transmitter is directionally oriented so that the central axis of the detection beam forms an angle A of approximately 12° with respect to a vertical line through the transmitter beam axis. In one application wherein the threshold sensor 10 is employed in conjunction with a conventional sliding door system, the detection beams B1, B2, B3 and B4 each subtend an angle which provides a horizontal sectional area above the threshold having a maximum diameter as great as 36 inches. The beams overlap to define detection zone Z.

The detector 30 is mounted in close proximity to the transmitters. The infrared detector 30 has a window which encompasses approximately 135°. The detector is positioned at the underside of the housing so as to present a viewing window which generally encompasses the vicinity of the threshold 22 and detection zone Z. The sensor preferably operates at 880 nanometers in the infrared region.

The threshold sensor 10 and its operation are illustrated in a general manner in FIG. 2. The sensor preferably operates on a 12 volt alternating current line voltage. A line synchronization circuit 40 functions to synchronize the operation of the sensor with the conventional 60 Hz. line frequency. Each of the infrared emitters 32, 34, 36 and 38 are operated at a 5 Khz frequency with a pulse of 20 microseconds generated by a clock circuit 42. A transmitter selector circuit 44 and a Darlington switch 46 are employed for sequentially pulsing the transmitters for time spaced 8 millisecond intervals. The transmitters are periodically simultaneously deactivated for 8 millisecond blackout intervals. A nearby sensor system may thus be operated so as to pulse the infrared transmitters in the complementary 8 millisecond blackout intervals to thereby prevent mutual interference and/or noise between nearby sensors. A voltage regulator 48 regulates the voltage at which the transmitters are pulsed.

The signals received by the infrared detector 30 are amplified and processed by an automatic gain control circuit 50. The received pulses and the clocking pulses are applied to a logic AND circuit 51 to identify reflected infrared radiation which originates from the transmitters. The output pulses are counted by a pulse counter 52.

The threshold sensor is a safety sensor specifically adapted to detect the presence of an object at or near the threshold when the door is in the open and/or opening position. The sliding door traverses a portion of the region encompassed by the detection zone Z during its sliding movement. Consequently, it is necessary that the presence of the door and the open position and opening movement of the door be accounted for by the sensor operation. The sensor is accordingly responsive to the closing of an operate contact monitor 53. Monitor 53 is responsive to the output of a motion sensor 28 or a push plate, card reader or another means (none of which are illustrated) which generate a signal to initiate the movement of the door to the opening position.

A derived operate signal and the pulse count is applied to a logic AND circuit 55 which generates a traffic presence output signal to the latch 56. A time delay circuit 58 is responsive to the output of the pulse counter 52 for delaying the latch for a pre-established time delay, for example, ½ second, after the presence signal has been removed. The latch 56 is set and the relay contacts 60 are closed to provide an output to the operator for maintaining the door in an opened position. In the event that the threshold sensor detects traffic presence in the vicinity of the threshold, then the relay contacts remain closed. The relay contacts 60 remain closed for a pre-selected time (½ second) to 2 seconds approximately after the threshold sensing zone Z has been cleared.

It will be appreciated that the sensor detects the presence of traffic in the vicinity of and at the threshold by detecting and identifying reflected infrared pulses which originate from the transmitters. The pulses are amplified by a gain controlled amplifier which is adjustable to disregard the background and the floor at the threshold. The detection of infrared radiation reflected from zone Z is essentially continuous. The presence of the sliding door in the detection zone, for example, when the door is closed, is sensed by the detection circuitry but is efficiently disregarded by the sensor via AND logic circuit 55 which only enables the latch and generates an appropriate door open signal when the operate signal derived from the operator operate initiating signal is present.

Figure 3A:
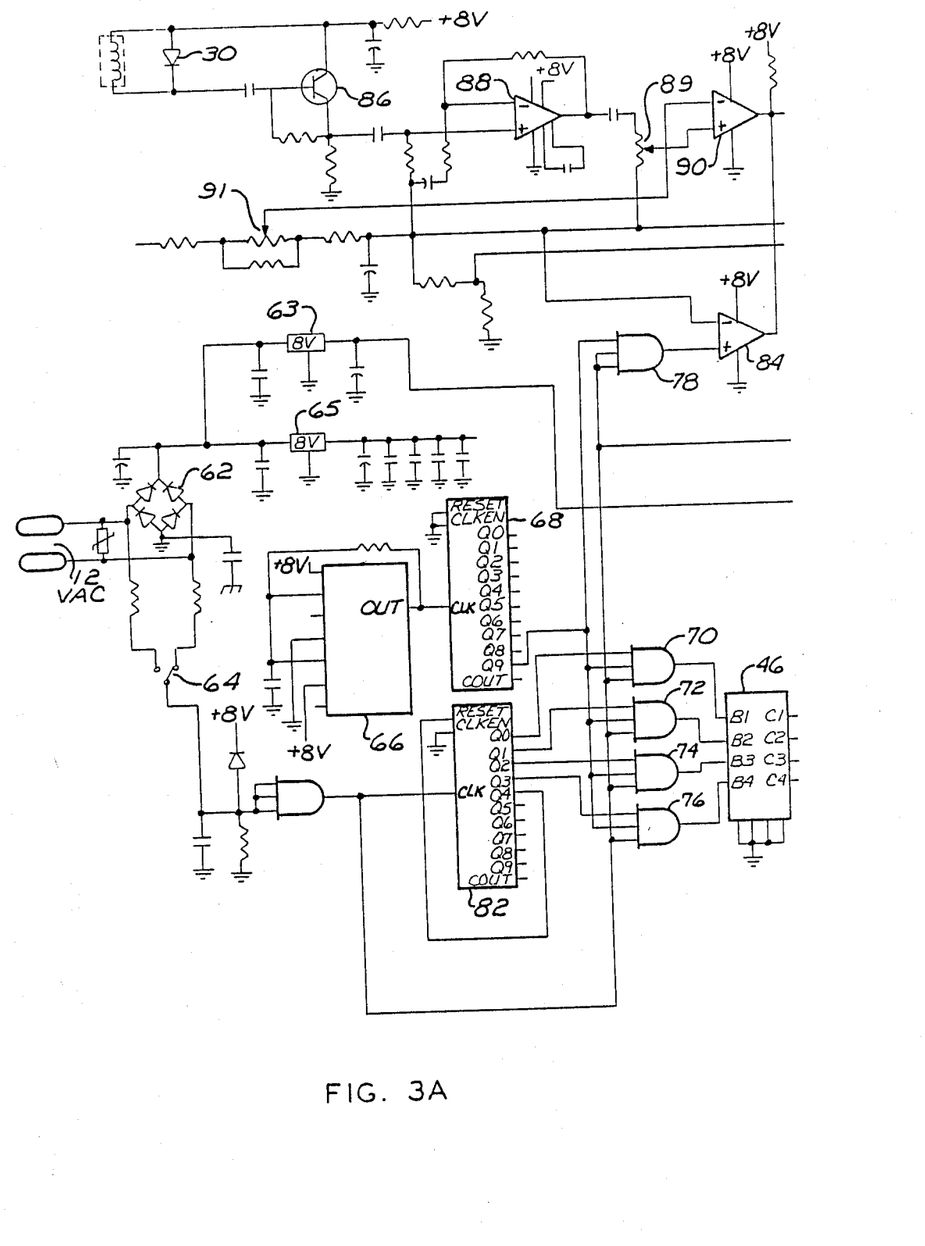
FIGS. 3A and 3B are schematic diagrams of the sliding door threshold sensor of FIG. 1.
Figure 3B:
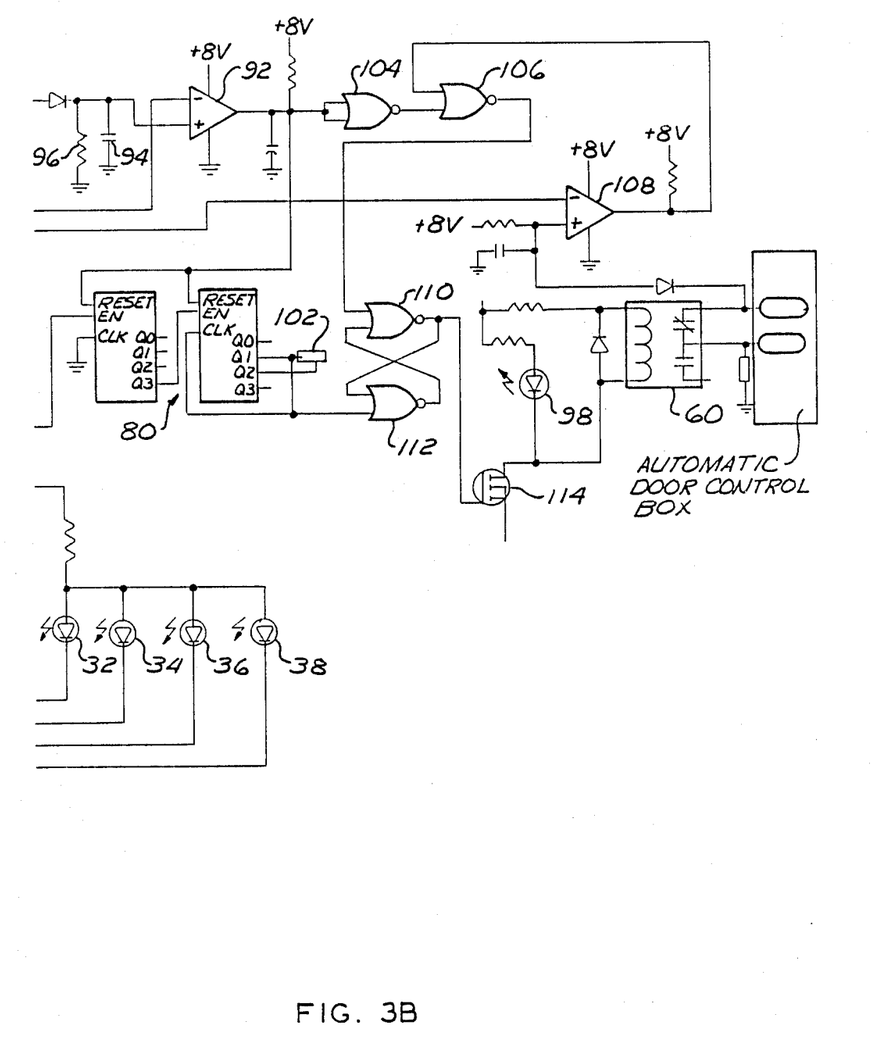

With reference to FIGS. 3A and 3B, the twelve volt alternating current line voltage is rectified by a bridge rectifier 62 and also filtered in a conventional manner. A voltage regulator 63 provides an 8 volt regulated voltage for the infrared transmitters. A second voltage regulator 65 provides an 8 volt regulated voltage for the detector 30 and the logic circuitry. A selector phase switch 64 synchronizes the sensor with the 60 Hz line frequency. Switch 64 provides two settings which are 180° out of phase so that two threshold sensors may be mounted in close proximity, such as required in dual door vestibule installations, without interference between the sensors. The regulated voltage is applied for sequentially operating the infrared transmitters 32, 34, 36 and 38.

With additional reference to FIGS. 3A and 3B, a 555-type oscillator timer 66 initiates a clocking sequence for a decade counter 68 which defines the transmitter pulse widths. The decade counter generates a 5 KHz signal having a 20 microsecond pulse width for application to each of 3-input AND gates 70, 72, 74 and 76 and to AND gate 78.

An in phase 8 millisecond pulse width signal which is synchronized with the line frequency is also applied to AND gates 70, 72, 74, 76 and 78. AND gate 78 functions as a phase control gate between the transmitted and received infrared radiation. The output of AND gate 78 is applied to a comparator 84 which grounds the received signal in the event the received signal is not in phase with the transmitters and the line frequency. The pulse width signal is also applied to a dual synchronous binary counter 80. Counter 80 functions to impose a pre-established time delay for maintaining the latched position for a time interval after traffic clears the zone Z. A second decade counter 82 is synchronized with the line frequency for applying in sequence a 16 millisecond pulse to AND gates 70, 72, 74 and 76, respectively. The output of AND gates 70, 72, 74 and 76 is applied to a quad Darlington switch for sequentially selectively pulsing the infrared transmitters 32, 34, 36 and 38 in synchronism with the applied line frequency. Each transmitter in sequence is periodically pulsed for 8 milliseconds (40 pulses). Blackout intervals of 8 millisecond duration separate each pulsing interval. None of the transmitters are pulsed during the alternating 8 millisecond black out intervals.

Infrared detector 30 is a PIN photo detector which receives infrared radiation and converts the radiation to an electrical signal. The signal is amplified by a transistor 86 and an operational amplifier 88 in a dual stage process. An adjustable nominal gain control potentiometer 89 is employed for adjusting the sensitivity of the system for background. An adjustable fine control potentiometer 91 is employed for finely tuning out the background, i.e., floor, rug etc. The potentiometers are adjusted to obtain a high detection zone sensitivity in close proximity to the floor.

A comparator 90 provides an output pulse when the received signal is greater than the adjusted background voltage. The comparator 90 generates an output pulse when the amplified signal from detector 30 exceeds the adjusted background voltage threshold. The output pulse from comparator 90 charges capacitor 94 and is applied to comparator 92. Comparator 92 functions as a pulse counter and generates an output pulse when the potential of the charged pulse exceeds the reference voltage. Resistor 96 functions to rapidly discharge capacitor 92 when the output pulse from comparator 90 ceases.

The output from comparator 92 is applied to reset the dual synchronous binary counter 80. The counter functions to implement a time delay interval for maintaining the door open status for a pre-established interval after traffic is no longer sensed in zone Z. A jumper wire 102 is incorporated into the circuitry. The time delay interval may be efficiently changed to a second different time delay by clipping the jumper wire 102.

The output from comparator 92 is also inverted at inverter 104 and applied to NOR gate 106. The second input to NOR gate 106 is an input signal derived from the automatic door operator operate initiation signal.

The operate signal is high when traffic is not detected. When traffic or any door initiating event is detected, the operate signal goes low. The operate input signal is applied to comparator 108. Comparator 108 has a reference voltage on the order of approximately one volt. The comparator 108 senses the change in the operate signal, and the low output from comparator 108 is applied to NOR gate 106.

The low inputs at NOR gate 106 (due to detection of traffic in zone Z and presence of operate signal) are inverted to transmit a high signal to latch 58 which comprises NOR gates 110 and 112. Latch 58 transmits a signal for energizing transistor 114. Transistor 114 denergizes the electrical relay 60 maintaining a door open condition for the automatic operator. NOR gate 112 receives an input from the time delay counter 80 and NOR gate 110 and essentially functions to energize the relay at the expiration of the delay period. It will be appreciated that the sensor sees the sliding door in the closed position as well as the initial door movement to the open position since the door traverses zone Z which is essentially continously monitored by the sensor. The operate initiating signal enables the latch to the latched state to de-energize the relay for maintaining the door open.

An indicator LED 98 is energizable to indicate the presence of traffic in zone Z and remains energized for a pre-established time after the traffic clears the zone Z. LED 98 is mounted to the circuit board 24 and is visible through the underside of housing 20.

It will be appreciated that the foregoing sensor system functions in an efficient manner wherein the transmitters generate a detection zone in the vicinity of and at the door threshold and the photodetector continuously monitors infrared energy reflected from the detection zone. The energy received by the photodetector is converted to an electrical signal and processed for verification. The presence of an operate signal together with the detection of reflected energy causes the sensor to generate an electrical output which maintains the door in an opened position as long as the object or traffic remains in the threshold vicinity. Because the sensor is synchronized with the line frequency, noise and other interference is reduced. In addition, the sensor provides periodic black-out windows which allow the system to efficiently operate in conjunction with a nearby sensor system without interference from the system.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A safety sensor for a sliding door system of a type wherein an automatic operator is at least partially responsive to an operate signal for initiating the operation of a sliding door which is transversely moveable across a threshold having opposing entrance and exit sides for selectively opening and closing an entranceway comprising:

detection zone means comprising a plurality of infrared transmitters energizable for emitting infrared radiation to define a detection zone which substantially encompasses a region above the threshold and the threshold vicinity at the opposing sides of the threshold;

synchronization means for synchronizing the operation of said sensor with an alternating current line frequency;

pulsing means responsive to said synchronization means for sequentially pulsing said transmitters in a series of time spaced pre-established pulse intervals;

receiver means for receiving reflected infrared radiation from said detection zone and generating a corresponding electrical detection signal;

verification means responsive to said detection signal for determining whether an object is present in said detection zone;

operate input means for supplying a signal indicative of the status of the operate signal;

circuit means including a latch circuit selectively actuatable between unlatched and latched states, said circuit means being responsive to said verification means and said operate input means for activating said latch circuit to the latched state in the event that an object is present in the detection zone and said operate signal is present; and safety signal means responsive to the latched state of said circuit means for generating a hold open output.

2. The safety sensor of claim 1 wherein said receiver means comprises a photo diode and said transmitters are angularly spaced infrared transmitters.

3. The safety sensor of claim 1 further comprising housing means for mounting said sensor generally above said threshold, said transmitters being oriented at divergent angles so as to each define overlapping regions of said detection zone.

4. The safety sensor of claim 3 wherein the number of transmitters is four and each transmitter has a central beam axis which is oriented at approximately 12° with respect to a vertical line through the axis.

5. The safety sensor of claim 1 wherein each of the pulse intervals are substantially equal and are time spaced by substantially equal time intervals.

6. The safety sensor of claim 1 further comprising a closure delay means for maintaining said latch circuit in a latched state for a pre-established time interval after an object leaves said detection zone.

7. A safety sensor for a sliding door system of a type wherein an automatic operator is at least partially responsive to an operate signal for initiating the operation of a sliding door which is transversely moveable across a threshold having opposing entrance and exit sides for selectively opening and closing an entranceway comprising:

housing means for mounting above the threshold;

detection zone means comprising a plurality of infrared transmitters mounted in said housing means and energizable for emitting infrared radiation to define a detection zone which substantially encompasses a region above the threshold and the threshold vicinity at the opposing sides of the threshold;

synchronization means for synchronizing the operation of said sensor with an alternating current line frequency;

pulsing means responsive to said synchronization means for sequentially pulsing said transmitters in a series of time spaced pre-established pulse intervals;

receiver means mounted in said housing means for receiving reflected infrared radiation from said detection zone and generating a corresponding electrical detection signal;

operate input means having a low and a high state for supplying a signal indicative of the status of said operate signal;

verification means responsive to said detection signal for determining whether an object is present in said detection zone, said pulsing means, said receiver means and said verification means being generally continuously operable regardless of the state of the operate input means;

circuit means including a latch circuit selectively actuatable between unlatched and latched states, said circuit means being responsive to said verification means and enabled by said operate input means for activating said latch circuit to the latched state in the event that an object is present in the detection zone and said operate signal is present; and safety signal means responsive to the latched state of said circuit means for generating a hold open output.

8. The safety sensor of claim 7 wherein said receiver means comprises a photo diode and said transmitters consist of four angularly spaced infrared transmitters.

9. The safety sensor of claim 7 wherein said transmitters are oriented at mutually divergent angles so as to each define overlapping regions of said detection zone.

10. The safety sensor of claim 7 wherein the receiver means consists of one photodiode and the number of transmitters is four and each transmitter has a central beam axis which is oriented at approximately 12° with respect to a vertical line through the axis.

11. The safety sensor of claim 7 wherein each of the pulse intervals are substantially equal and are time spaced by substantially equal time intervals.

12. The safety sensor of claim 7 further comprising a closure delay means for maintaining said latch circuit in a latched state for a pre-established time interval after an object leaves said detection zone.

13. The safety sensor of claim 7 further comprising switch means having two states for selectively synchronizing the operation of the sensor at one of two 180° phase spaced relationships.

14. The safety sensor of claim 7 wherein said latch is enabled when said operate input signal switches from a high to a low state.

15. A safety sensor for a sliding door system of a type wherein an automatic operator is at least partially responsive to an operate signal for initiating the operation of a sliding door which is transversely moveable across a threshold having opposing entrance and exit sides for selectively opening and closing an entranceway comprising:

detection zone means comprising a plurality of infrared transmitters energizeable for emitting infrared radiation to define a detection zone which substantially encompasses a region above the threshold and the threshold vicinity at the opposing sides of the threshold;

synchronization means for synchronizing the operation of said sensor with an alternating current line frequency;

pulsing means responsive to said synchronization means for sequentially pulsing said transmitters in a series of time spaced pre-established pulse intervals;

receiver means for receiving reflected infrared radiation from said detection zone and generating a corresponding electrical detection signal;

verification means responsive to said detection signal for determining whether an object is present in said detection zone, said verification means comprising counter means for counting pulses and phase select means for selecting pulses having a pre-established phase relationship with the radiation transmitted by said transmitter;

operate input means for supplying a signal indicative of the status of the operate signal;

circuit means including a latch circuit selectively actuatable between unlatched and latched states, said circuit means being responsive to said verification means and said operate input means for activating said latch circuit to the latched state in the event that an object is present in the detection zone and said operate signal is present; and safety signal means responsive to the latched state of said circuit means for generating a hold open output.

16. The safety sensor of claim 15 wherein said receiver means comprises a photo diode and said transmitters are angularly spaced infrared transmitters.

17. The safety sensor of claim 15 further comprising housing means for mounting said sensor generally above said threshold, said transmitters being oriented at divergent angles so as to each define overlapping regions of said detection zone.

18. The safety sensor of claim 19 wherein the number of transmitters is four and each transmitter has a central beam axis which is oriented at approximately 12° with respect to a vertical line through the axis.

19. The safety sensor of claim 15 wherein each of the pulse intervals are substantially equal and are time spaced by substantially equal time intervals.

20. The safety sensor of claim 15 further comprising a closure delay means for maintaining said latch circuit in a latched state for a pre-established time interval after an object leaves said detection zone.

21. A safety sensor for a sliding door system of a type wherein an automatic operator is at least partially responsive to an operate signal for initiating the operation of a sliding door which is transversely moveable across a threshold having opposing entrance and exit sides for selectively opening and closing an entranceway comprising:

detection zone means comprising a plurality of infrared transmitters energizeable for emitting infrared radiation to define a detection zone which substantially encompasses a region above the threshold and the threshold vicinity at the opposing sides of the threshold;

synchronization means for synchronizing the operation of said sensor with an alternating current line frequency;

pulsing means responsive to said synchronization means for sequentially pulsing said transmitters in a series of time spaced pre-established pulse intervals;

receiver means for receiving reflected infrared radiation from said detection zone and generating a corresponding electrical detection signal;

verification means responsive to said detection signal for determining whether an object is present in said detection zone;

operate input means for supplying a signal indicative of the status of the operate signal;

circuit means including a latch circuit selectively actuatable between unlatched and latched states, said circuit means being responsive to said verification means and said operate input means for activating said latch circuit to the latched state in the event that an object is present in the detection zone and said operate signal is present;

safety signal means responsive to the latched state of said circuit means for generating a hold open output; and switch means having two states for selectively synchronizing the operation of the sensor at one of two 180° phase spaced relationships.

* * * * *